US008849506B2

(12) United States Patent
Suzuki

(10) Patent No.: US 8,849,506 B2
(45) Date of Patent: Sep. 30, 2014

(54) OPERATION SYSTEM FOR VEHICLE

(75) Inventor: Ryo Suzuki, Chiba (JP)

(73) Assignees: Hyundai Motor Japan R&D Center, Inc., Yokohama (JP); Kia Motors Corporation, Seoul (KR); Hyundai Motor Company, Seoul (KR)

( * ) Notice: Subject to any disclaimer, the term of this patent is extended or adjusted under 35 U.S.C. 154(b) by 308 days.

(21) Appl. No.: 12/627,595

(22) Filed: Nov. 30, 2009

(65) Prior Publication Data

US 2011/0060499 A1    Mar. 10, 2011

(30) Foreign Application Priority Data

Sep. 4, 2009   (JP) ................................ 2009-205182

(51) Int. Cl.
*G06F 3/01* (2006.01)
*G06F 3/042* (2006.01)
*G06F 3/041* (2006.01)
*B60R 11/02* (2006.01)
*G06F 3/0488* (2013.01)

(52) U.S. Cl.
CPC .............. *G06F 3/017* (2013.01); *G06F 3/0425* (2013.01); *G06F 2203/04808* (2013.01); *G06F 3/0416* (2013.01); *B60R 11/0264* (2013.01); *G06F 3/0488* (2013.01)
USPC ............... 701/36; 701/49; 345/173; 345/175; 715/781; 715/863

(58) Field of Classification Search
CPC ........................ G06F 3/017; G06F 2203/04808
USPC .................. 345/173–178; 715/781, 863, 867; 701/36, 49; 382/104, 106
See application file for complete search history.

(56) References Cited

U.S. PATENT DOCUMENTS 5,825,352 A * 10/1998 Bisset et al. .................. 345/173
7,499,569 B2 * 3/2009 Sato et al. ..................... 382/103
7,877,707 B2 * 1/2011 Westerman et al. .......... 715/863
(Continued)

FOREIGN PATENT DOCUMENTS

JP         05-298016      11/1993
JP         10-269012      10/1998
(Continued)

OTHER PUBLICATIONS

STIC Search Report for application 12627595 dated Jan. 19, 2012.*

*Primary Examiner* — John Q Nguyen
*Assistant Examiner* — Michael Whalen
(74) *Attorney, Agent, or Firm* — Edwards Wildman Palmer LLP; Peter F. Corless

(57) ABSTRACT

The present invention provides an operation system for a vehicle capable of shortening an operation time, reducing an operation load, and improving visibility of a display section. The operation system includes an operation section on which a camera capturing a finger and a touch panel are installed, and a display section installed away from the operation section, and further includes a finger determination processor determining from an image captured by the camera whether or not an object approaching the operation section is a hand, a conversion processor converting a determination signal of the finger determination processor into a display instruction signal and outputting the converted result, and a pop-up processor displaying an operation button or an operation window on the display section before the hand is touched to the touch panel on the basis of the display instruction signal input from the conversion processor.

9 Claims, 11 Drawing Sheets

(56) References Cited

U.S. PATENT DOCUMENTS

| | | | |
|---|---|---|---|
| 8,049,722 B2* | 11/2011 | Kumon | 345/158 |
| 8,077,970 B2* | 12/2011 | Ishikawa | 382/181 |
| 8,094,189 B2* | 1/2012 | Kumon | 348/115 |
| 2004/0141634 A1* | 7/2004 | Yamamoto et al. | 382/104 |
| 2005/0063564 A1* | 3/2005 | Yamamoto et al. | 382/104 |
| 2007/0253596 A1* | 11/2007 | Murata et al. | 382/103 |
| 2008/0168403 A1* | 7/2008 | Westerman et al. | 715/863 |
| 2009/0149991 A1* | 6/2009 | Sumida et al. | 700/246 |
| 2010/0310129 A1* | 12/2010 | Hopfner | 382/104 |
| 2010/0318266 A1* | 12/2010 | Schaaf et al. | 701/49 |
| 2011/0022264 A1* | 1/2011 | Conan et al. | 701/36 |
| 2012/0249474 A1* | 10/2012 | Pratt et al. | 345/174 |

FOREIGN PATENT DOCUMENTS

| | | |
|---|---|---|
| JP | 11-134090 | 5/1999 |
| JP | 2003-322500 A | 11/2003 |
| JP | 2007-069676 | 3/2007 |
| JP | 2007-152984 | 6/2007 |
| JP | 2007-156950 | 6/2007 |
| JP | 2007-237954 | 9/2007 |
| JP | 2007-237986 A | 9/2007 |
| JP | 2007-286667 | 11/2007 |
| JP | 2007-302215 A | 11/2007 |
| WO | 2008-078603 A1 | 7/2008 |

* cited by examiner

OPERATION SYSTEM FOR VEHICLE

CROSS-REFERENCE TO RELATED APPLICATION

This application claims under 35 U.S.C. §119(a) the benefit of Japanese Patent Application No. 2009-0205182 filed Sep. 4, 2009, the entire contents of which are incorporated herein by reference.

BACKGROUND (a) Technical Field

The present disclosure relates to an operation system for a vehicle. More particularly, it relates to an operation system for a vehicle that can ensure shorter operation time, lower operation load, and higher visibility of a display section.

(b) Background Art

In operation systems known in the art (e.g., Japanese Patent Application Publication No. Hei 10-269012), an operator who wants to operate an on-vehicle appliance, such as an audio device, an air conditioning device, a car navigation device, or the like, needs to press a touch panel, and a touch signal generated by pressing the operation button (i.e. a signal generated when the operation button is pressed on the touch panel) is output from the touch panel.

More specifically, a menu window for selecting one of the on-vehicle appliances is called, a certain on-vehicle appliance is then selected, and an operation window on which the operation buttons (e.g., volume control button) of the corresponding on-vehicle appliance are arranged is then called (see FIG. 6 of Japanese Patent Application Publication No. Hei 10-269012). This is, however, time-consuming and inconvenient due to the long sequence.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides an operation system for a vehicle including an operation section on which a touch panel and a camera for capturing an image of a vehicle operator's finger or fingers are installed and a display section installed integrally with or separately from the operation section. The operation system comprises: a finger determination processor for determining from an image captured by the camera whether or not an object approaching the operation section is a hand; a conversion processor for converting a determination signal of the finger determination processor into a display instruction signal and outputting the display instruction signal; and a pop-up processor for displaying an operation button or an operation window on the display section before the finger or fingers are touched to the touch panel on a basis of the display instruction signal input from the conversion processor.

Preferably, the finger determination processor may determine the number of the finger and output a determination signal when it is determined that the object approaching the operation section is the hand. The pop-up processor may synthesize the operation button or the operation window corresponding to the number of fingers determined by the finger determination processor with a displayed window and display the synthesized result, or convert the operation button or the operation window into the displayed window and display the converted result.

Preferably, the operation system of claim may further comprise: an image processor for receiving the image captured by the camera, processing the received image, and outputting an image processing signal of the finger or fingers; and a synthesizing processor for receiving the image processing signal output from the image processor, synthesizing the image with the displayed window input by the pop-up processor, sending the synthesized result to the display section such that the displayed window with which the image is synthesized is displayed on the display section.

Also preferably, the operation system may further comprise an image processor for receiving the image captured by the camera, processing the received image, and outputting an image processing signal of the finger or fingers, wherein the finger determination processor receives the image processing signal output from the image processor, and determines from the received image processing signal whether or not the object approaching the operation section is the hand and what the number of fingers is. In this case, the finger determination processor may recognize the object approaching the operation section by a gradual increase in size of an image of the object.

Suitably, the conversion processor may continue to display the operation button or the operation window without elimination when the hand is moved away from the operation section and when a preset driving operation is detected by an electronic control unit. In this case, the conversion processor may continue to display the operation button or the operation window without elimination when operation of any one of a turn signal device, a steering wheel, a shift lever, a power window device, and an air conditioner is detected.

Also suitably, the conversion processor may output an elimination instruction signal to the pop-up processor after a predetermined time has lapsed such that the operation button or the operation window is eliminated, when a condition that the hand of the operator moves away from the operation section and that the operation button or the operation window continues to be displayed is released. In this case, preferably, the conversion processor may eliminate the operation button or the operation window if the hand is not captured again for a set time when the hand of the operator is moving away from the operation section and when the preset driving operation is detected by the electronic control unit. Also preferably, the conversion processor may eliminate the operation button or the operation window if the hand is not captured again for a set reference time when the hand of the operator is moving away from the operation section and when the preset driving operation is not detected by the electronic control unit.

With the operation systems, the operation time can be remarkably shortened. Further, as a selection range of the operation button or the operation window can be expanded and the shape of the operation button can be increased, the visibility can be significantly improved. Also, like the case in which the hand of the operator moves away from the operation section in favor of steering wheel operation, etc. the display is configured to be continued without eliminating the operation button or the operation window, so that the operation can be performed when the steering wheel operation, etc. is completed. When the operation button or the operation window is eliminated, the elimination is configured to take place after a predetermined time has lapsed. As such, although a short-time operation, for instance a change in angle of a sun visor, is performed, the operation window can be continuously operated without interruption.

The above and other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
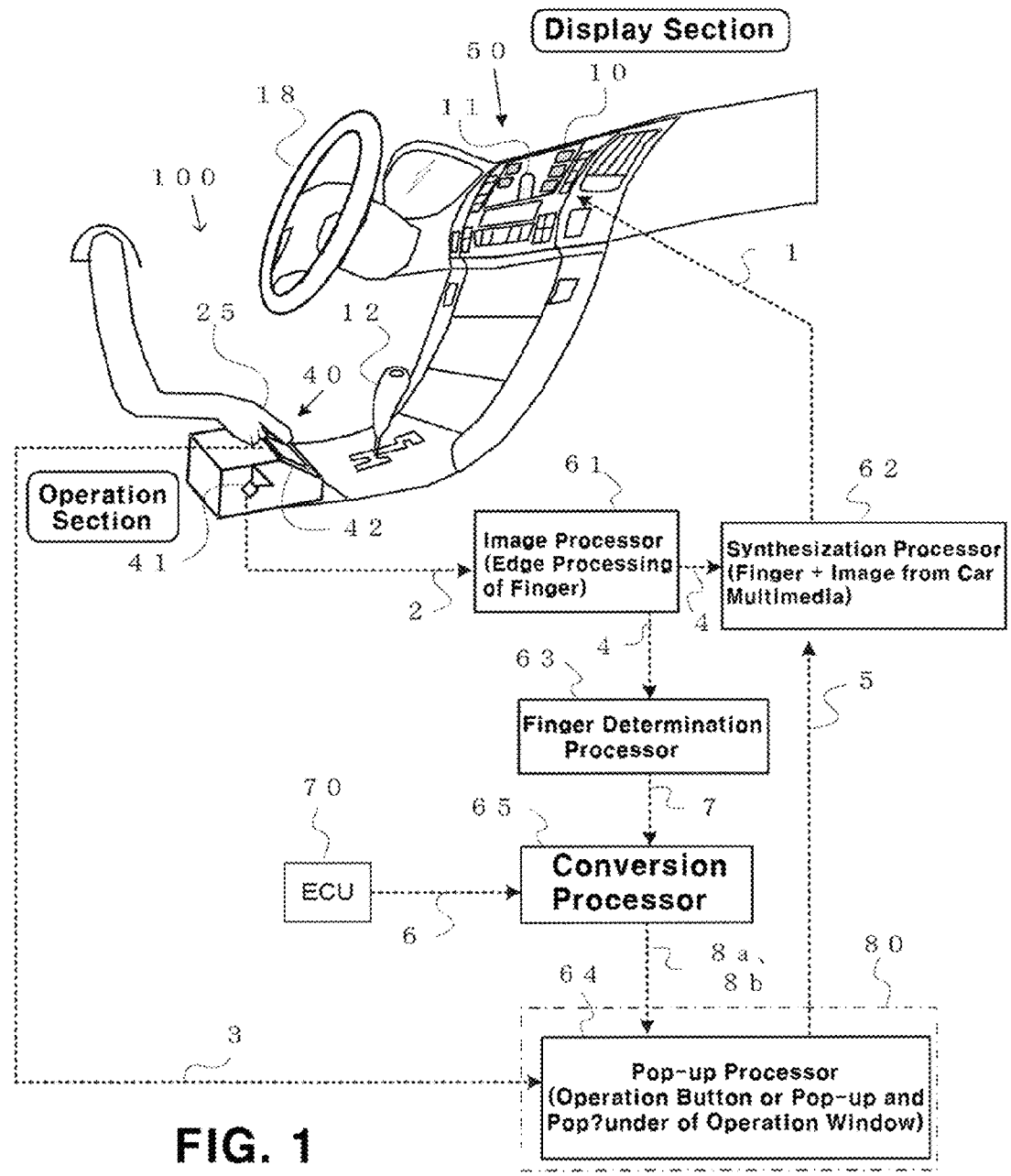
FIG. 1 shows the configuration of an operation system for a vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 shows the configuration of an operation system for a vehicle according to an exemplary embodiment of the present invention. The operation system 100 for a vehicle according to an exemplary embodiment of the present invention includes an operation section 40 and a display section 50, an image processor 61, a finger determination processor 63, a conversion processor 65, a pop-up processor 64, and a synthesization processor 62.

The operation section 40 includes a touch panel 42. The display section 50 may be installed integrally with the or separately from the operation section 40. The display section 50 includes a monitor. Here, the monitor may be installed in the middle of a dashboard in the vehicle. Further, the operation section 40 is provided with a camera 41 for capturing a hand 25 of an operator. Preferably, as shown in FIG. 1, a shift lever 12 may be located in the middle of the vehicle and a steering wheel 16 may be installed in the left front seat. The display section 50 is configured to display an operation button 10 and an image 11 of the finger of the operator overlapping with each other. The operator may move the finger on the touch panel 42 to cause the operation button 10 to overlap with the image 11 of the finger, and then press the touch panel (the operation button portion intended for operation), thereby performing the operation. The touch panel 42 may include, but not limited to, a pressure sensitive type and a capacitance type.

The image processor 61 receives a capture signal 2 from the camera 41, and performs edge processing of the captured finger. Then, an image processing signal 4 of the finger is sent to the synthesization processor 62. The synthesization processor 62 synthesizes the image of the finger with a displayed window (for instance, assuming that a map for car navigation, etc. is previously set). The synthesization processor 62 sends the synthesized image signal 1 to the display section 50. The image processor 61 also sends the image processing signal 4 of the finger to the finger determination processor 63. Thus, the finger determination processor 63 determines whether or not an object approaching the operation section 40 is a hand on the basis of the received image processing signal 4 of the finger. When it is determined that the approaching object is a hand, the finger determination processor 63 determines the number of fingers, and sends a finger determination signal 7 to the conversion processor 65. Thus, the conversion processor 65 converts the finger determination signal 7 into a display indication signal 8a of the operation button or the operation window intended for pop-up, and sends it to the pop-up processor 64.

The pop-up processor 64 selects and pops up the instructed operation button or operation window according to the display instruction signal received from the conversion processor 65. In this embodiment, the pop-up processor 64 is configured to be realized within a multimedia appliance 80 equipped with a navigation device, an audio, a telephone, and so on. The synthesization processor 62 synthesizes the image of the finger with the window selected by the pop-up processor (the operation button or the operation window selected according to the display instruction signal), and sends the synthesized result to the display section 50. When a predetermined time has lapsed after the hand moves away from the operation section 40, and then when an elimination or pop-under instruction signal 8b of the operation button or the operation window is received from the conversion processor 65, the pop-up processor 64 eliminates (or pops under) the popped-up operation button or operation window. Here, the conversion processor 65 outputs the elimination instruction signal 8b such that the pop-up processor 64 eliminates the popped-up operation button or operation window, when the condition that the operation button or the operation window continues to be displayed, for instance, the condition that an electronic control unit (ECU) 70 detects a preset driving operation as described below, is released.

The ECU 70 outputs the operation status of a turning signal device (e.g. indicator), a steering wheel, a shift lever, a power window device, an air conditioner, etc. as a vehicle control signal 6, and inputs it into the conversion processor 65. Here, a coordinate signal 3 is a signal that represents a touch position of the touch panel 42, and is processed by the car multimedia appliance 80.

The conversion processor 65 generates an instruction signal, for instance, that is instructed of number five when the number of fingers is determined to be five, number one when the number of fingers is determined to be one, or number zero when the number of fingers is determined to be zero, and outputs it to the pop-up processor 64 as the display instruction signal 8a. Further, when the operation button or operation window is eliminated, the conversion processor generates, for instance, number six, and outputs it to the pop-up processor 64 as the elimination instruction signal 8b. The pop-up processor 64 pops up a map scale-up and -down button or a volume adjustment button of a simple operation window in the case of number five, an audio operation window in the case of number one, a destination setup window for car navigation in the case of number two, or the map scale-up and -down button or the volume adjustment button in the case of number zero as in the case of number five. The pop-up processor eliminates the operation button or operation window in the case of number six. The conversion processor 65 may be configured to generate number five when the number of fingers is three, like when the number of fingers is five. Since the vehicle control signal 6 is input from the ECU 70 into the conversion processor 65, the conversion processor 65 may be configured neither to output the instruction signal of number six to the pop-up processor 64 nor to cause the pop-up processor to eliminate the operation button or the operation window although a notification informing that the finger moves away from the operation section 40 is received from the finger determination processor 63.

With the configuration of FIG. 1, the operator may pop up the operation button or the operation window displayed by the number of fingers by putting the hand 25 toward the operation section while displaying the number of fingers. In FIG. 1, an example of giving an instruction with an index finger is shown. The image 11 of the finger is synthesized with the displayed window, and is displayed on the display section 50.

Figure 2:
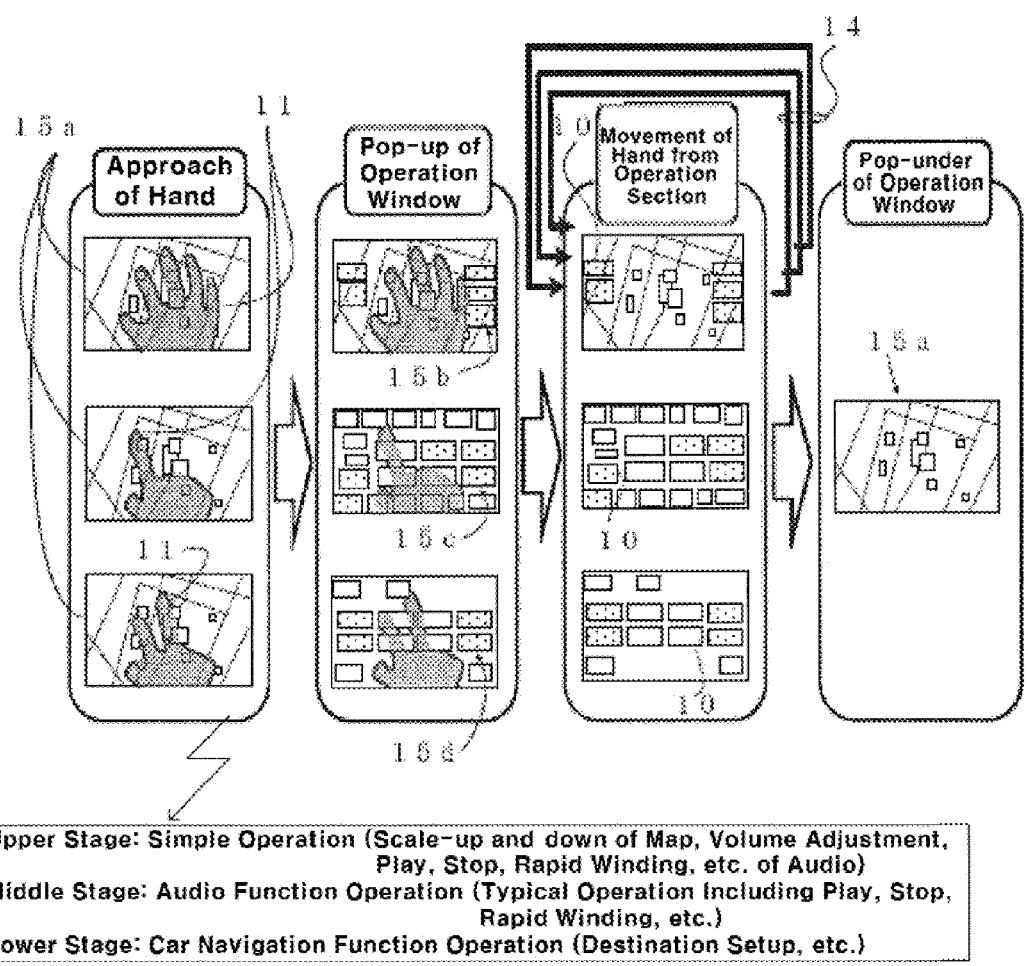
FIG. 2 shows an example of operation sequence of the system of FIG. 1.

FIG. 2 shows an example of operation sequence of the system of FIG. 1 in which an operation button or an operation window is popped up by the number of fingers. In FIG. 2, an upper stage for a simple operation such as a map scale-up and -down operation, a middle stage for an audio operation, and a lower stage for an destination setup operation for car navigation are shown corresponding to the number of fingers. An operation window 15 as a graphical user interface (GUI) includes a simple operation window 15b, an audio operation window 15c, and a destination setup window 15d for car navigation. The operation button 10 includes a map scale-up and -down button, a volume adjustment button, a destination setup button, and so on.

The upper stage of FIG. 2 shows the case where the number of fingers is five. The displayed window 15a is set for a preset map for the car navigation. As shown in "Pop-up of Operation Window" column, when it is determined that the number of fingers is five, the simple operation window 15b is popped up. In this example, the displayed window 15a is not changed into the simple operation window 15b, but is displayed such that the operation button 10 is synthesized to the displayed window 15a. The image 11 of the finger, which is moved, captured and synthesized, overlaps with the operation button 10, and then the touch panel 42 is pressed, so that the operation can be performed. When the hand is moving away from the operation section 40, the image 11 of the finger disappears, as shown in "Movement of Hand from Operation Section" column. Subsequently, as shown in "Pop-under of Operation Window" column, the operation button 10 disappears, and the window for the map continues to be displayed.

For example, the operation button 10 may be displayed on the map window at all times. In this case, the operation button occupies a region of the map window, in which case the display region of the map can be reduced. In order to make the display region sufficiently large, reducing the size of the operation button may be considered. However, if the operation button becomes too small, it may be difficult to manipulation the operation button. Accordingly, the size of the operation button can be changed depending on design features and consumer needs.

In this respect, since the operation button 10 designated by the number of fingers as described above is displayed by intention of the operator, there is no problem although visibility of the map window is somewhat lowered, and since the shape of the operation button 10 can be made large, the visibility of the window can be improved.

The middle stage of FIG. 2 shows the case where the number of fingers is one. When approaching the operation section 40, the finger is captured by the camera 41. Thus, as shown in "Approach of Hand" column, the image 11 of the finger is synthesized to the displayed window 15a. In this embodiment in which the number of fingers is one, as shown in "Pop-up" column, the audio operation window 15c is popped up. The audio operation window 15c includes a button for adjusting a sound volume, or the operation button 10 for changing a broadcasting station. Here, the image 11 of the finger, which is moved, captured and synthesized, overlaps with the operation button 10, and then the touch panel 42 is pressed, the adjustment of the sound volume, etc. can be performed. Further, when the hand is moving from the operation section 40, the image 11 of the finger disappears, as shown in "Movement of Hand from Operation Section" column. Subsequently, as shown in "Pop-under of Operation Window" column, the audio operation window 15c disappears, and the window returns to the window for the map.

The lower stage of FIG. 2 shows the case where the number of fingers is two. When approaching the operation section 40, the finger is captured by the camera 41. Thus, as shown in "Approach of Hand" column, the image 11 of the finger is synthesized to the displayed window 15a. In this embodiment in which the number of fingers is two, as shown in "Pop-up" column, the destination setup window 15d for car navigation is popped up. The destination setup window 15d for car navigation includes the operation button 10 for setting a destination. Here, the image 11 of the finger, which is moved, captured and synthesized, overlaps with the operation button 10, and then the touch panel 42 is pressed, the destination can be set. Further, when the hand is moving from the operation section 40, the image 11 of the finger disappears, as shown in "Movement of Hand from Operation Section" column. Subsequently, as shown in "Pop-under of Operation Window" column, the destination setup window 15*d* for car navigation disappears, and the window returns to the window for the map.

In FIG. 2, when the hand moves away from the operation section 40 to operate, for instance, a steering wheel, the operation window 15 or the operation button 10 are configured to be continuously displayed without elimination. This is indicated by an arrow having a reference number 14.

Figure 3:
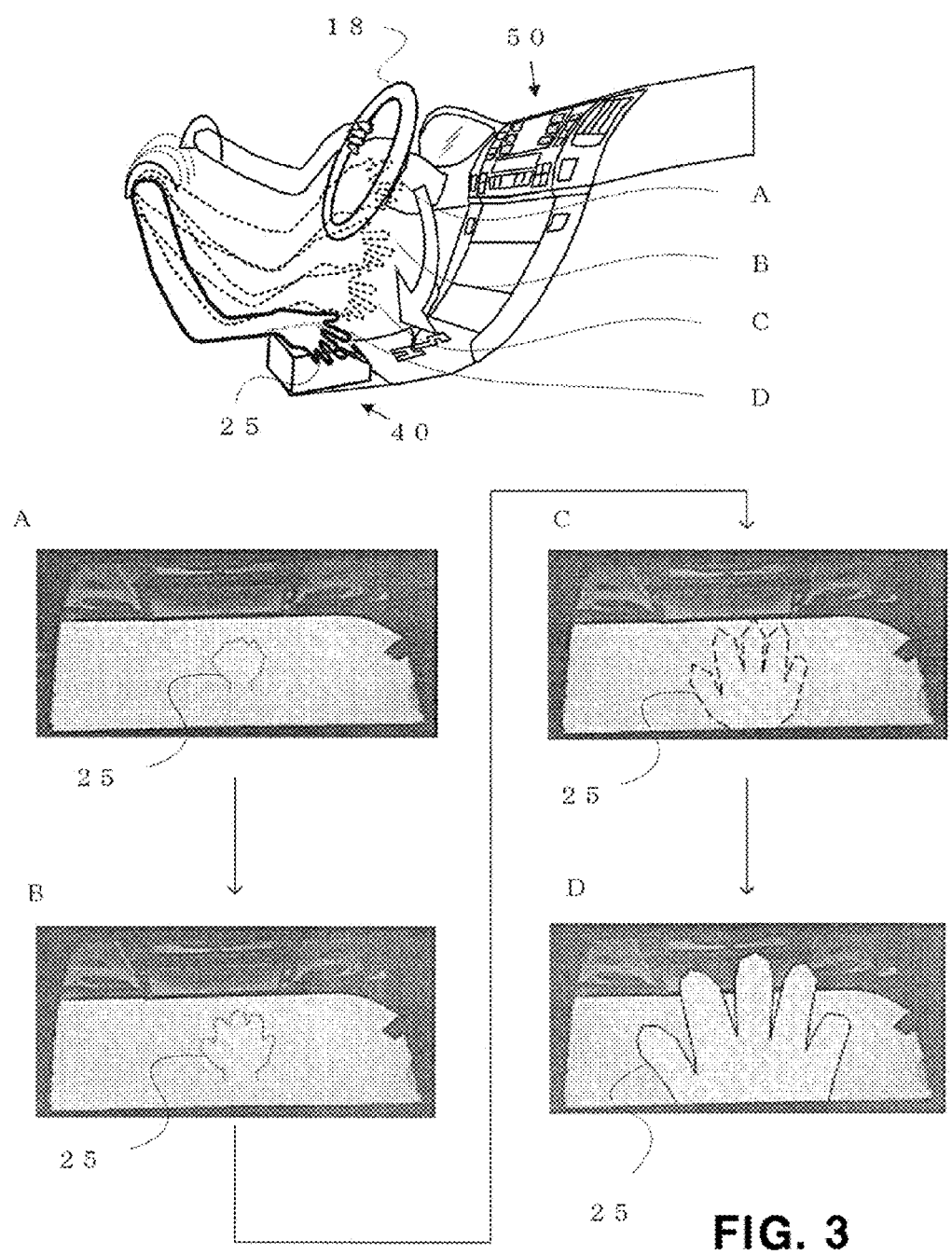
FIG. 3 shows an example of the image of fingers captured by a camera.

FIG. 3 shows an example of the image of the finger captured by the camera 41. There is shown the case where the hand 25 of the operator who holds the steering wheel 18 moves toward the operation section 40 in order to perform the operation. Images A to D are taken by the camera 41 to sequentially capture movement of the hand In the images, a lower gray portion is an outside landscape of the windshield of the vehicle, and an upper black portion is a dashboard. In the image A, the image is not so clear that it is difficult to discriminate the finger. In the image B, it can be recognized as the hand, but it is difficult to discriminate the number of fingers. In each of the images C and D, it can be recognized as the hand and it is possible to discriminate the number of fingers. It can be found that the hand 25 of the operator is approaching the operation section 40 by a gradual increase in size of the image of the hand. In detail, the approaching object is recognized from the gradual increase in size of the image of the hand, and then the finger determination processor 63 receives the image processing signal 4 of the image processor 61, and determines both whether or not the object approaching the operation section 40 is the hand and the number of fingers on the basis of the received image processing signal. In this manner, the number of fingers can be recognized by analysis of the image before the hand is touched to the touch panel 42 of the operation section 40.

Figure 4:
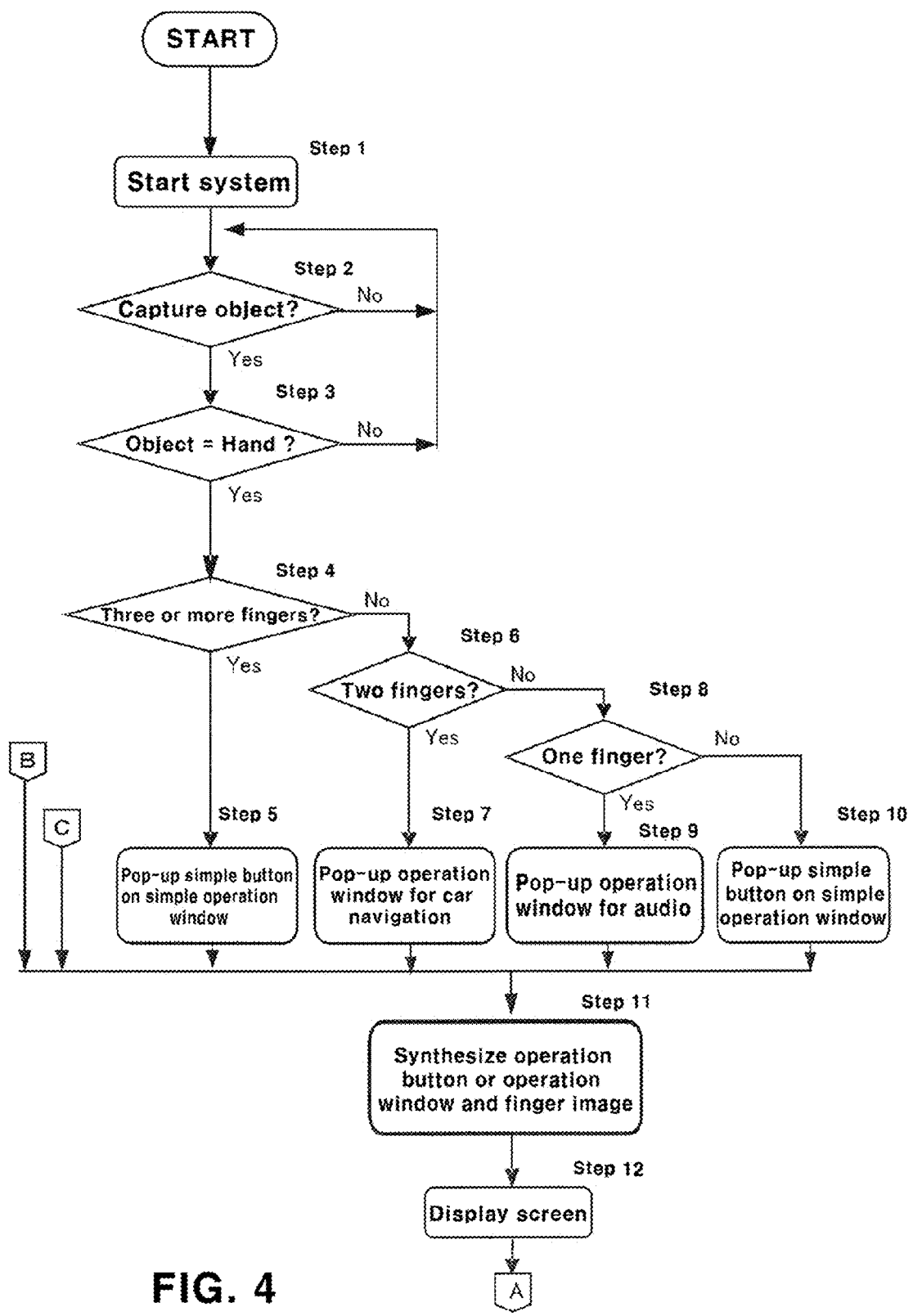
FIG. 4 is the first part of a flowchart showing the control process of an operation controller of the operation system according to the present invention.
Figure 5:
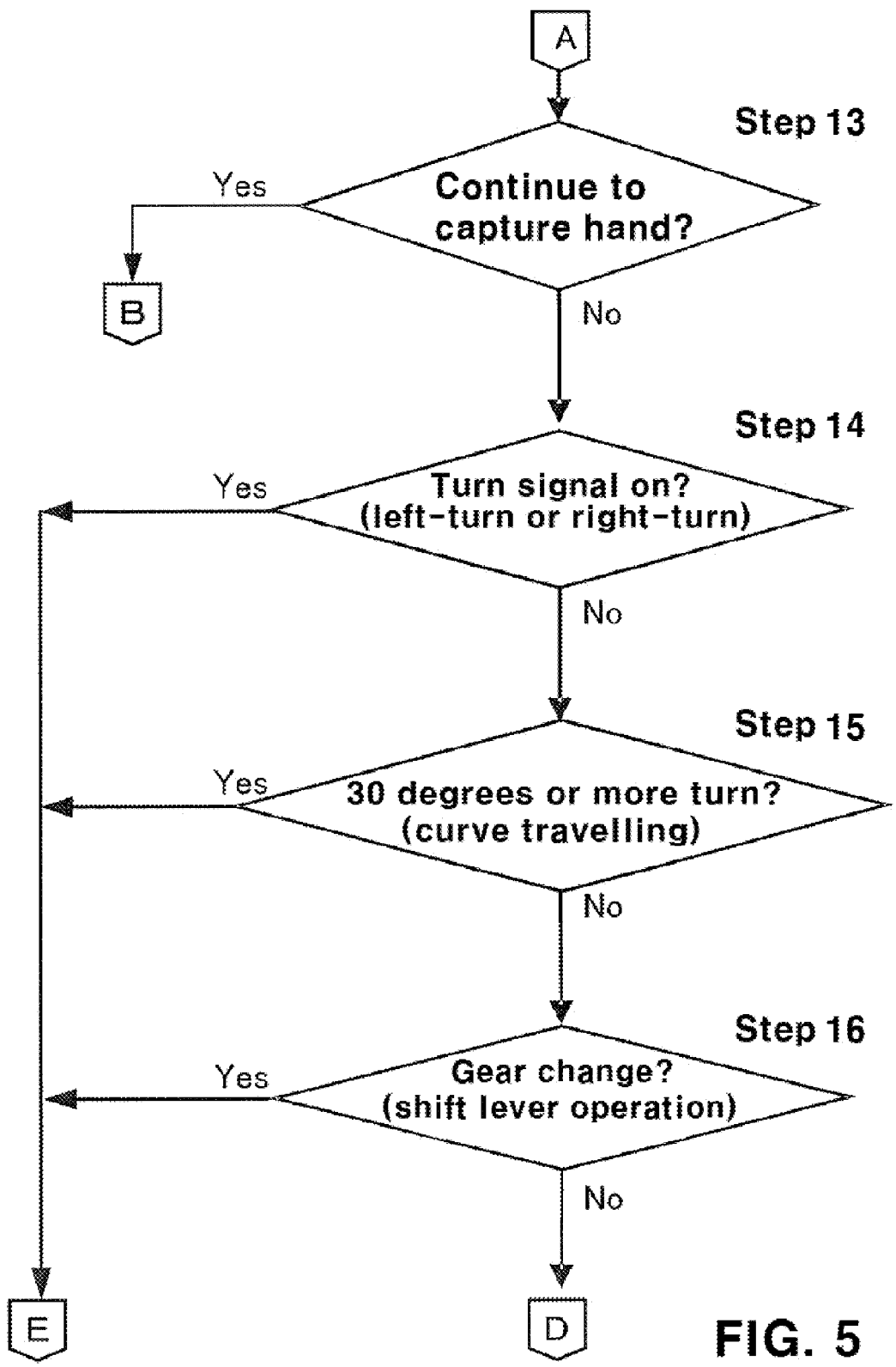
FIG. 5 is the second part of a flowchart showing the control process of an operation controller of the operation system according to the present invention.
Figure 6:
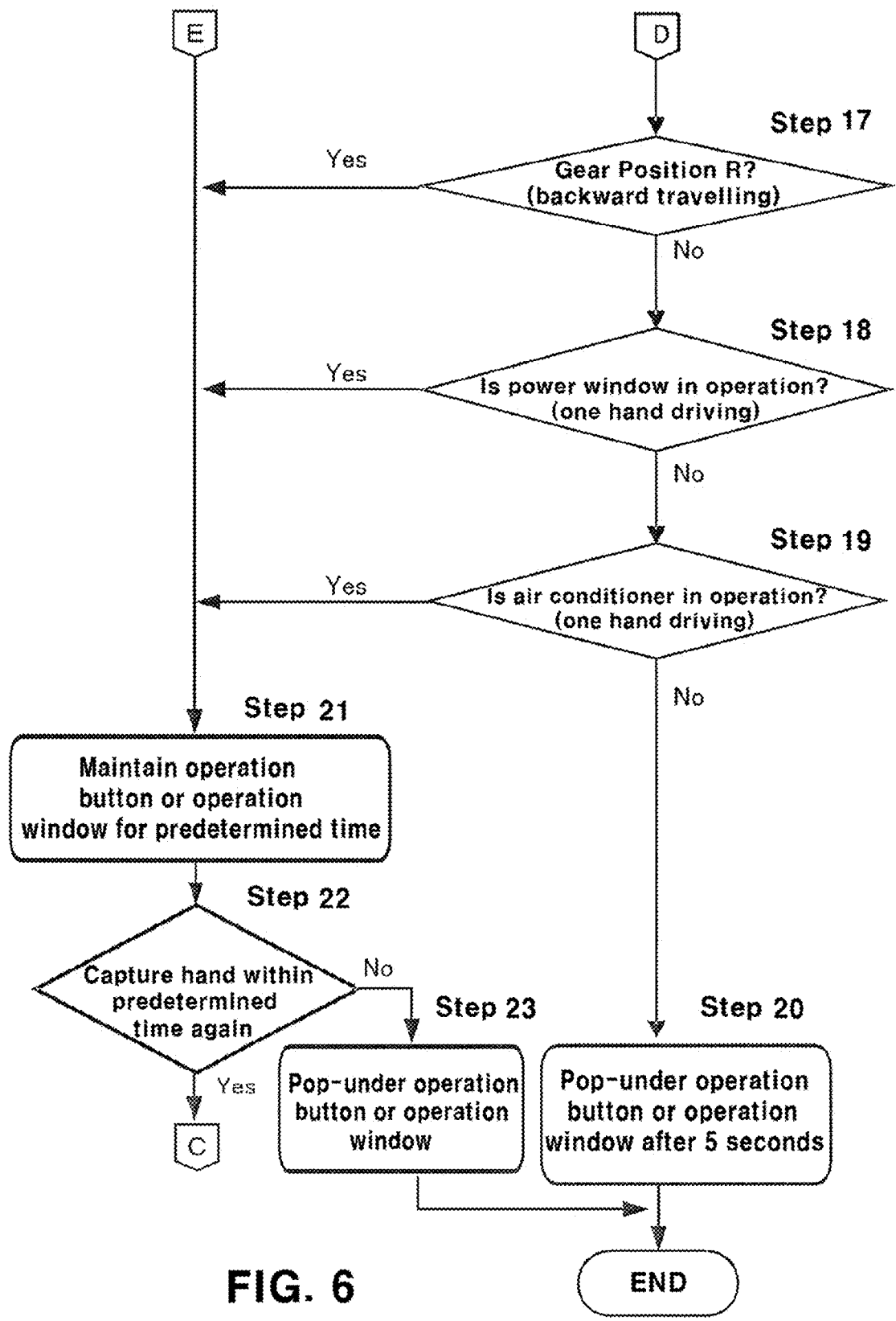
FIG. 6 is the third part of a flowchart showing the control process of an operation controller of the operation system according to the present invention.

FIGS. 4 through 6 are flowcharts showing the control process of the operation system according to the present invention.

In FIG. 4, when a system is started, i.e. when an ignition switch is switched on (step 1), it is determined whether or not the camera 41 captures an object (step 2) and then determined whether or not the object captured by the camera 41 is a hand (step 3). The steps 2 and 3 are processed by the finger determination processor 63 of FIG. 1.

Steps 4, 6 and 8 determine the number of fingers. These steps are processed by the finger determination processor 63 of FIG. 1. More particularly, the step 4 determines whether or not the number of fingers is three or more. If it is determined to be "Yes," it proceeds to step 5. If it is determined to be "No," it proceeds to step 6. The step 6 determines whether or not the number of fingers is two. If it is determined to be "Yes," it proceeds to step 7. If it is determined to be "No," it proceeds to step 8. The step 8 determines whether or not the number of fingers is one. If it is determined to be "Yes," it proceeds to step 9. If it is determined to be "No," it proceeds to step 10.

In steps 5, 7, 9 and 10, the operation button of the simple operation window 15*b* including the map scale-up and -down button or the volume adjustment button, the destination setup window 15*d* for car navigation (including the destination setup button), or the audio operation window 15*c* (including the audio operation button) is popped up according to the number of fingers. The step 10 shows the case in which the number of fingers cannot be recognized. In detail, this case may include the case in which the hand is recognized as a fist or the fingers are in contact with each other. In this step 10, the operation button of the simple operation window 15*b* may be set to be popped up as in the step 5.

In step 11, the operation button or the operation window and the image of the finger are synthesized and displayed. The step 11 is processed by the synthesization processor 62. In step 12, the window synthesized by the synthesization processor 62 is output to the display section 50.

As shown in FIG. 5, step 13 determines whether or not the hand continues to be captured. If it is determined to be "Yes," it returns to B of FIG. 4. In the meantime, the image 11 of the finger is displayed on the touch panel 42 while being overlapped with the operation button 10. The touch panel 42 can then be pressed, so that an instruction can be given. The pressing operation of the operation button is not shown in the flowchart. In step 13, if it is determined to be "No," it proceeds to step 14.

Steps 14 through 16 are carried out in the case in which the hand is moved away from the operation section 40 and thus is not captured by the camera 41 of the operation section 40. The step 14 determines whether or not a turn signal device (indicator) is switched on. If so, it is determined that the hand moves away from the operation section 40 in favor of outputting a turn signal. While a turn signal is being outputted, no operation is possible in the operation section 40. The step 15 determines whether or not the steering wheel 18 is being turned at a preset reference angle, for instance, 30 degrees or more. If so, it is determined that the hand moves away from the operation section 40 in favor of operating the steering wheel 18. The step 16 determines whether or not a gear is being changed. If so, it is determined that the hand moves away from the operation section 40 in favor of holding the shift lever 12. If it is determined to be "Yes" in any of the steps 14 through 16, it proceeds to E (see E of FIG. 6), and then the display is continued without elimination of the operation window. On the other hand, If it is determined to be "No" in all the steps 14 through 16, it proceeds to D (see D of FIG. 6). This determination is processed by the conversion processor 65 on the basis of the vehicle control signal 6 received from the ECU 70 of FIG. 1.

As shown in FIG. 6, steps 17 through 19 are carried out in the case in which the hand is moved away from the operation section 40 and thus is not captured by the camera 41 of the operation section 40. The step 17 determines whether or not the gear is located at R (reverse). If so, it is determined that the hand moves away from the operation section 40 in favor of operating the steering wheel. The step 18 determines whether or not the power window is being operated. If so, it is determined that the hand moves away from the operation section 40 in favor of operating a window switch with the left hand and hold the steering wheel with the right hand. The step 19 determines whether or not the air conditioner is being operated. If so, it is determined that the hand moves away from the operation section 40 in favor of operating the air conditioner installed on the dashboard. In the present embodiment, the air conditioner is configured not to be operated by the operation section 40 and the display section 50.

If it is determined to be "No" in all the steps 17 through 19, it proceeds to step 20, and the operation button or the operation window is eliminated after a predetermined time, e.g., five seconds. For example, like the case in which the hand moves in favor of adjusting the angle of a sun visor, when the hand is returned (i.e. captured again) within a preset reference time (e.g., 5 seconds) even when no sensor is installed on the sun visor, the operation button or the operation window is not eliminated, and thus the display is continued. If it is determined to be "Yes" in any of the steps 17 through 19, it proceeds to step 21, and the operation button or the operation window is kept for a preset set time (e.g. 1 minute). Step 22 determines whether or not the hand is captured within a predetermined time again. If it is determined that the hand is not captured again within the predetermined time, the conversion processor 65 outputs the elimination instruction signal 8b to the pop-up processor 64 such that the pop-up processor 64 eliminates the operation button or the operation window (step 23).

In contrast, if it is determined that the hand is captured again within the predetermined time, it returns to C.

FIGS. 7 through 11 are views illustrating examples of driving operation of a vehicle with the operation system according to the present invention, in which the operation button or the operation window continues to be displayed without elimination. The driving operation may be detected by various sensors.

Figure 7:
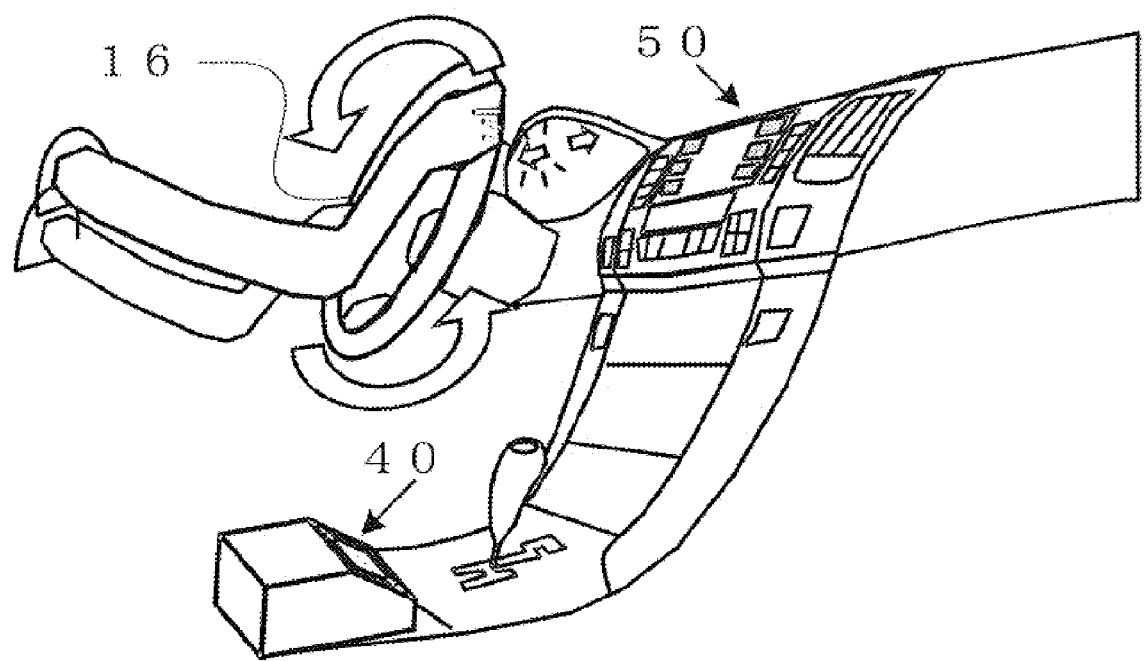
FIG. 7 is a view illustrating an example of driving operation of a vehicle with the operation system according to the present invention.
Figure 8:
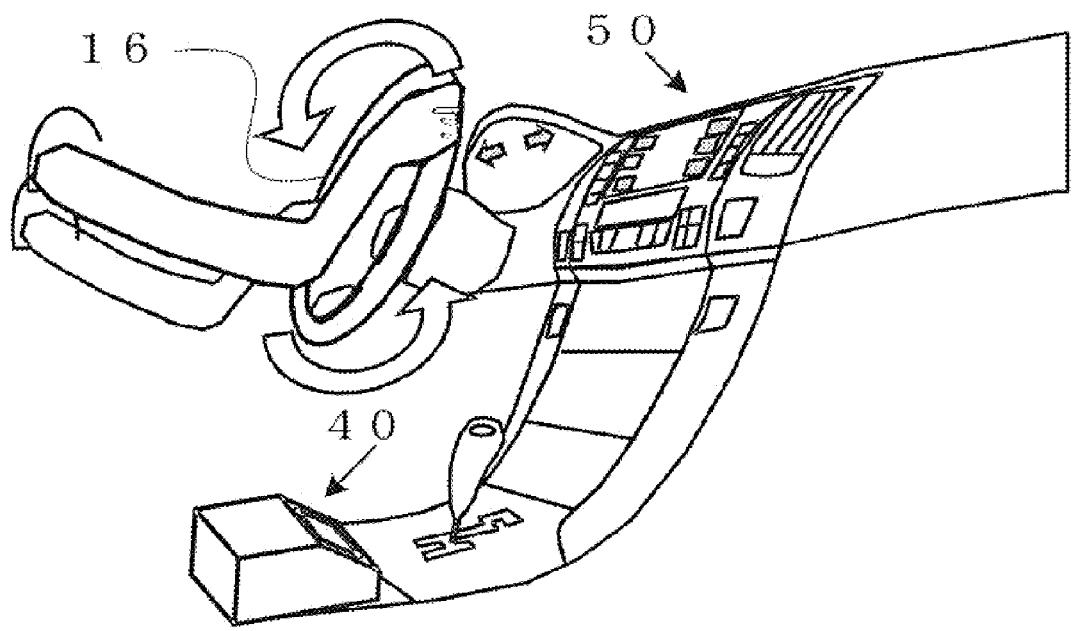
FIG. 8 is a view illustrating another example of driving operation of a vehicle with the operation system according to the present invention.
Figure 9:
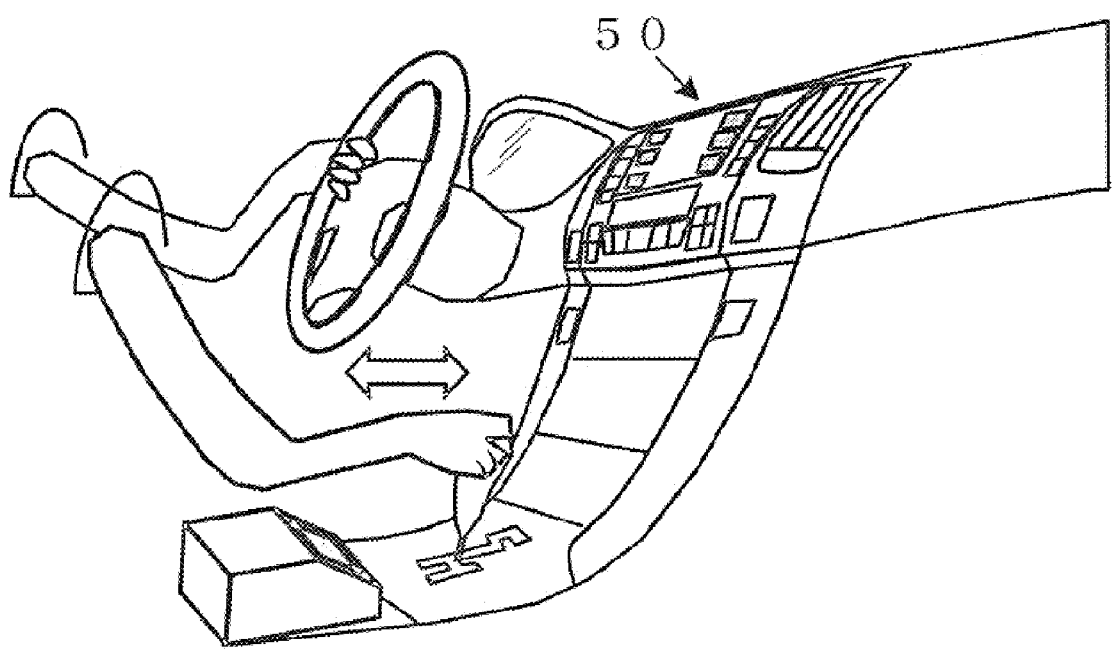
FIG. 9 is a view illustrating yet another example of driving operation of a vehicle with the operation system according to the present invention.
Figure 10:
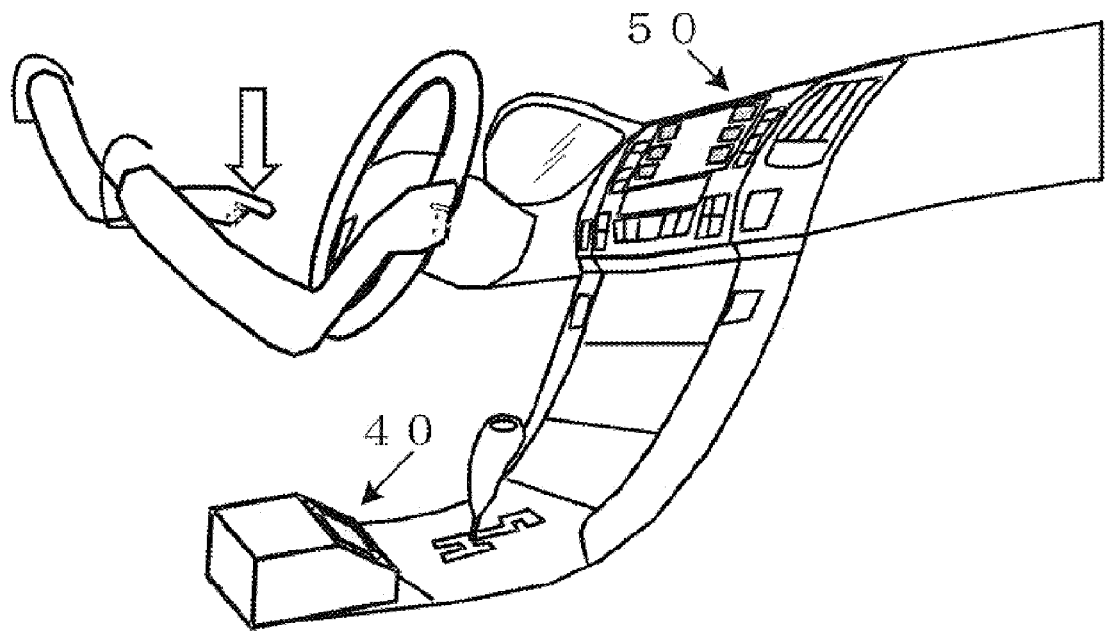
FIG. 10 is a view illustrating still another example of driving operation of a vehicle with the operation system according to the present invention.
Figure 11:
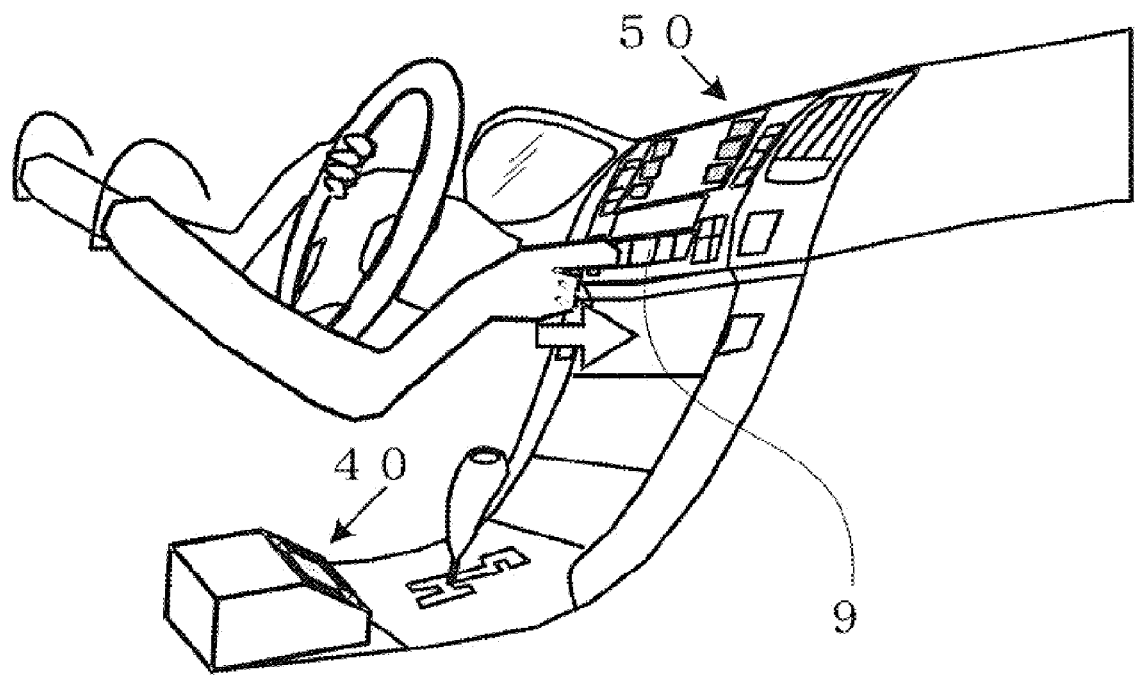
FIG. 11 is a view illustrating a further example of driving operation of a vehicle with the operation system according to the present invention.

That is, FIG. 7 shows left-turn (or right-turn) operation or waiting. It may be determined from the signal of a turning signal sensor whether or not the turn signal device (indicator) is switched on. FIG. 8 shows curve-travel or cornering operation. It may be determined from the signal of a steering angle sensor whether or not the steering wheel is being operated for curve-travel. FIG. 9 shows shift lever operation. It may be determined from the signal of a shift position sensor whether or not the shift lever is being operated. FIG. 10 shows power window operation. It may be determined by the on/off signal of a power window switch whether or not the power window device is being operated. Here, the power window operation is regarded as the driving operation. FIG. 11 shows air conditioner operation. The air conditioner operation is regarded as the driving operation. It may be determined by the push signal of a switch whether or not the air conditioner is being operated. All the operation shown in the examples show the cases where a vehicle operator's hand cannot easily be placed on the operation section 40 and/or the placement can only be made after a predetermined time (e.g., 5 seconds.)

The present systems provide various advantages including shorter operation time, lower operation load, and higher visibility of a display section.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An operation system for a vehicle operation system comprising:
    an operation section on which a touch panel and a camera for capturing an image of a vehicle operator's finger or fingers are installed, the operation section providing a plurality of pop-ups;
    a display section provided with a monitor installed in the middle of a dashboard in the vehicle, separately from the operation section;
    a finger determination processor configured to determine from an image captured by the camera both whether or not an object approaching the operation section is a hand based an image processing signal and once the finger determination processor determines that the object is a hand, determines the number of fingers on the hand based on the image processing signal of the hand as the hand gradual increases in size as the hand approaches the operation section to determine which of the pop-ups to display;
    a conversion processor configured to convert a determination signal of the finger determination processor into a display instruction signal and outputting the display instruction signal, wherein the conversion processor generates an instruction signal that indicates the number of fingers approaching the operation section when it is determined that the object approaching is a hand; and
    a pop-up processor configured to display an image of the hand with the determined number of fingers based on the number of determined fingers on the monitor of the display section and also display a particular operation button or an operation window on the monitor of the section.

2. The operation system of claim 1, wherein:
    outputs a determination signal when it is determined that the object approaching the operation section is the hand; and
    the pop-up processor synthesizes the operation button or the operation window corresponding to the number of fingers determined by the finger determination processor with a displayed window and displays the synthesized result, or converts the operation button or the operation window into the displayed window and displays the converted result.

3. The operation system of claim 2, further comprising:
    an image processor for receiving the image captured by the camera, processing the received image, and outputting an image processing signal of the finger or fingers; and
    a synthesizing processor for receiving the image processing signal output from the image processor, synthesizing the image with the displayed window input by the pop-up processor, sending the synthesized result to the display section such that the displayed window with which the image is synthesized is displayed on the display section.

4. The operation system of claim 2, further comprising an image processor for receiving the image captured by the camera, processing the received image, and outputting an image processing signal of the finger or fingers, wherein the finger determination processor receives the image processing signal output from the image processor, and determines from the received image processing signal whether or not the object approaching the operation section is the hand and what the number of fingers is.

5. The operation system of claim 1, wherein the conversion processor continues to display the operation button or the operation window without elimination when the hand is moved away from the operation section and when a preset driving operation is detected by an electronic control unit.

6. The operation system of claim 5, wherein the conversion processor continues to display the operation button or the operation window without elimination when operation of any one of a turn signal device, a steering wheel, a shift lever, a power window device, and an air conditioner is detected.

7. The operation system of claim 5, wherein the conversion processor outputs an elimination instruction signal to the pop-up processor after a predetermined time has lapsed such that the operation button or the operation window is eliminated, when a condition that the hand of the operator moves away from the operation section and that the operation button or the operation window continues to be displayed is released.

8. The operation system of claim 7, wherein the conversion processor eliminates the operation button or the operation window if the hand is not captured again for a set time when the hand of the operator is moving away from the operation section and when the preset driving operation is detected by the electronic control unit.

9. The operation system of claim 7, wherein the conversion processor eliminates the operation button or the operation window if the hand is not captured again for a set reference time when the hand of the operator is moving away from the operation section and when the preset driving operation is not detected by the electronic control unit.

* * * * *